Figure 1:
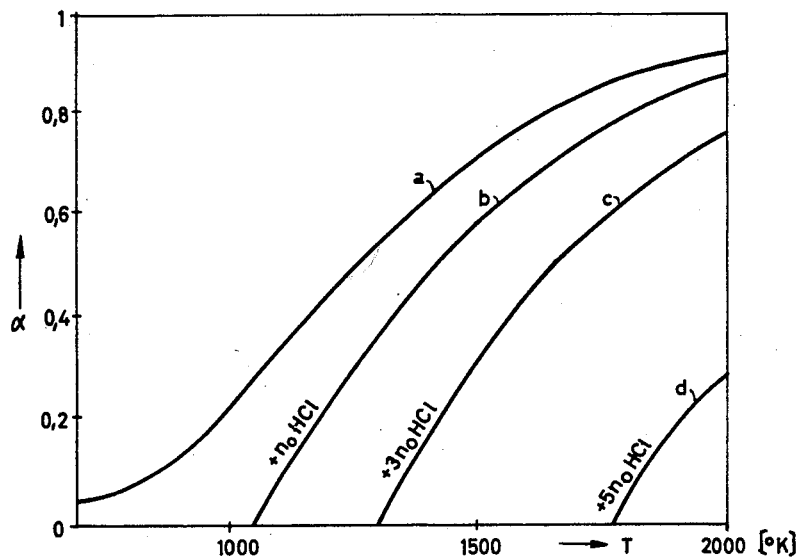

United States Patent Office 3,160,476
Patented Dec. 8, 1964

3,160,476
PROCESS OF PRODUCING COMPACT BORON, PARTICULARLY IN MONOCRYSTALLINE FORM
Erhard Sirtl, Munich, Germany, assignor to Siemens & Halske Aktiengesellschaft, Berlin, Germany, a corporation of Germany
Filed Mar. 5, 1962, Ser. No. 177,496
Claims priority, application Germany, Mar. 6, 1961, S 72,846
15 Claims. (Cl. 23—209)

My invention relates to methods of producing highly pure boron in compact crystalline or monocrystalline form by pyrolytic precipitation from a gaseous boron compound.

More specifically, my invention deals with methods according to which a reaction gas, consisting essentially of a purified halogen-containing boron compound, preferably mixed with purified hydrogen, is passed over a heated carrier body, and the boron liberated from the reaction gas by thermal dissociation is precipitated onto the carirer body thus growing a boron layer thereupon.

It is an object of my invention to pyrolytically produce compact and crystalline bodies of boron, such as are desirable for electronic purposes, that possess a coherent and smooth surface substantially free of protuberances and fissures.

Another object of my invention is to improve the pyrolytic processing conditions for securing a monocrystalline growth of the boron substance being precipitated and to increase the reliability or yield of monocrystalline production.

Still another object of my invention is to improve the degree of purity of the boron produced pyrolytically and to preserve such high purity during the entire course of the processing, to produce a boron body having the desired ultimate thickness, while avoiding or minimizing the precipitation of impurities, especially silicon, during the pyrolytic process.

To achieve these and further objects and advantages as will appear in the following, and in accordance with a feature of my invention, a pyrolytic boron-producing process, generally of the above-mentioned type, is carried out by adding to the reaction gas from the outset, i.e., before the gas is contacted with the heated carrier body, an admixture of a hydrogen-halogen compound, preferably a hydrogen halide, which modifies the reaction equilibrium in favor of the bonded boron. The quantity of added hydrogen halide is such that the temperature $T_0$, at which re-dissolution of the boron occurs, due to substances produced in the precipitating reaction and present in the reaction gas, is at most 200° C. below the selected precipitation temperature T and the boron precipitation is completely stopped below this equilibrium temperature $T_0$. Boron in compact form, for example a rod or plate-shaped body of boron, is preferably employed as the carrier body. A suitable rod-shaped carrier body of boron can be produced for example by shaping a mass of boron powder, pre-sintering the shaped body and then subjecting it to zone melting (as described by E. S. Greiner, Journal of Applied Physics, vol. 30, page 598 (1959)). The heating of the carrier to the pyrolytic precipitation temperature T, this being the surface temperature of the carrier that is to be maintained during the precipitation process, can be effected by any suitable means, for example inductive heating or by directly passing current through the preheated carrier body. When heating the carrier by direct passage of electric current, the carrier is held by means of electrodes and assumes glowing temperature by electric current supplied through the electrodes. When using a hyperpure carrier body, which exhibits only very slight electric conductance at room temperature, the body is first preheated. This preheating can be done by means such as by heat radiation. The reaction gas, passing along the heated carrier, becomes dissociated by the heat issuing from the carrier with formation of free boron, which precipitates onto the carrier where it crystallizes, thereby causing the carrier to grow in thickness. The crystalline structure of the precipitated boron is partly determined by the constitution of the carrier, which presents the possibility, in principle, of producing a monocrystalline boron precipitation by employing a monocrystalline carrier.

I have found that, with respect to obtaining a compact and smooth, particularly monocrystalline growth of boron, the constitution of the surface of the boron body upon which further boron is being precipitated, is of essential importance. To achieve a monocrystalline growth, it is necessary that, at the beginning of the precipitation process, the monocrystalline structure of the precipitation-receiving surface be carefully laid bare. This can be done, for example, by etching, or polishing the carrier surface by etching prior to commencing the pyrolytic precipitation, followed by purification of the polished surface by vaporizing or otherwise disintegrating or spattering material from the surface in high vacuum or in a suitable protective gas atmosphere.

The method of the invention preferably uses a pyrolytic precipitation temperature T of about 1200° K. or higher, the upper limit being determined by the melting point of boron, but in practice being less than about 2000° K. At those localities of the carrier surface where the temperature is below the critical equilibrium value $T_0$, precipitation does not occur but rather a dissolution of boron occurs. This affords the possibility, more fully explained hereinbelow, to prevent the growth of boron at protuberances on the carrier surface.

Irregularities are often observed during crystalline growth of the boron being precipitated. The surface of the thickening carrier is frequently rather craggy or fissured. Such irregularities interfere with the preferred character of growth, particularly in cases where a monocrystalline product is desired. These irregularities are also disturbing in cases where there is a simultaneous precipitation of doping substances from the gaseous phase, in order to produce p-n junctions in the precipitating crystalline, particularly monocrystalline, boron. Such formation of wartlike protuberances and grooves can be reliably prevented by properly performing the method according to the invention.

As mentioned, the conversion of the reaction gas to precipitated boron is effected pyrolytically or electrothermally or can also be effected by an electric gas discharge as long as the heating of the carrier body produces the necessary pyrolytic processing temperature T within a flow of free reaction gases. Since according to the invention these reaction gases comprise a halogen-containing compound of boron, the pyrolytic reaction, as a rule, results in the formation of new halogen-containing compounds which were not present in the reaction gas originally supplied to the reaction chamber and which, with the preferred employment of a gas quantity flowing through a reaction vessel, generally leave the reaction vessel together with the residual waste gases. Since the reaction gas mixture contains hydrogen as a reducing agent, the above-mentioned new halogen compounds comprise hydrogen halides. Such hydrogen halides are always formed when the pyrolytic precipitation from a halogen-containing boron compound is effected at a temperature below the melting point of boron and purified hydrogen is used as a carrier gas in order to increase the yield to an economically acceptable degree. For this reason, it is preferably that the hydrogen-halogen compound; added to the reaction gas, prior to contacting the reaction gas with the heated carrier body; consists of a hydrogen compound of the same halogen element which is contained in the boron compound of the reaction gas being used. Consequently, when employing boron halogenides such as $BBr_2Cl$, $BCl_3$, $BCl_2Br$, it is preferable to add gaseous hydrogen chloride to the reaction gas for causing it to enter into contact with the heated carrier body.

Figure 2:
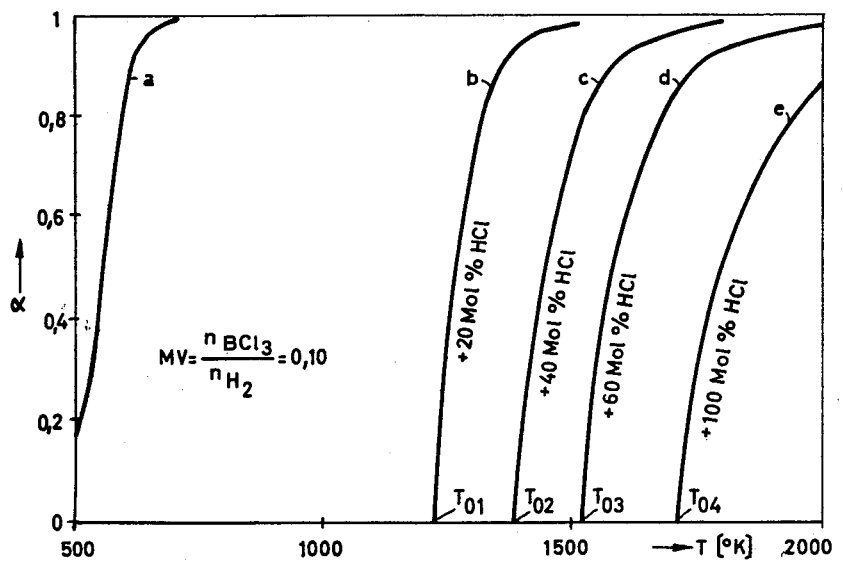

My invention is further described with reference to the accompanying drawings in which FIGS. 1 and 2 are explanatory graphs and FIGS. 3 to 6 are four schematic examples of equipment to carry out the process.

By virtue of the additional supply of hydrogen halide of the kind that will be formed by the pyrolytic reaction, the equilibrium conditions are greatly improved with respect to the desired crystalline or monocrystalline growth of boron precipitating from the reaction gas. This effect can be explained as follows:

It has been ascertained that the boron precipitation from the pure reaction gas mixture (fresh gas), is not normally completely extinguished even at relatively low temperatures. If one plots the theoretically possible conversion degree $\alpha(0 \rightarrow 1)$ or the maximal boron yield $(0 \rightarrow 100\%)$ in a diagram versus the surface temperature of the carrier, the resulting curve has the characteristic of curve $a$ in the diagram of FIG. 1. In this diagram, the abscissa denotes temperature in degree Kelvin (° K.) and the ordinate denotes the conversion degree $\alpha$. The precipitation curve $a$ approaches the abscissa in a generally asymptotical manner with a very small angle at lower temperatures. However, by the addition of HCl, the precipitation curve in the direction of the temperature axis becomes increasingly steeper so that a well defined intersection point occurs at a temperature $T_0$ at which no boron precipitates, this intersection point being shown by each of curves $b$, $c$ and $d$.

The reasons for this change in characteristic resides in the fact that below the temperature $T_0$, due to the presence of HCl in the reaction gas, the reaction occurs in the reverse direction. This means that boron is no longer precipitated from the reaction gas but that, conversely, boron already present is dissolved by the reaction gas and hence is converted into the boron compound present in the reaction gas and, possibly, other gaseous boron compounds.

A reaction gas mixture containing boron trichloride ($BCl_3$) and hydrogen ($H_2$) in a molar ratio of 1:10 was passed through the precipitation apparatus in a continuous flow to obtain the values in curves $a$ to $d$ of FIG. 1. In the following, the proportion of the boron trichloride in the reaction gas mixture in mol percent is denoted by $n_0$. The curve $b$ in FIG. 1 was determined with the presence of $n_0$ HCl in the reaction gas mixture. The curve $c$ was obtained with an addition of $3n_0$ HCl. Curve $d$ was determined with an addition of $5n_0$ HCl. All precipitation curves intersect the temperature axis with an increasing steepness (slope) with increasing HCl content. The critical temperature $T_0$ also increases with the HCl content of the reaction gas. Furthermore, the curves approach a saturation or maximum value with further increase in temperature.

Consequently, it is possible to vary the intersection of the precipitation curves with the temperature axis and also increase the steepness of the tangent of the precipitation curve at the intersection, by means of HCl addition or by varying this HCl addition. If the hydrogen halide is added to the reaction gas in such a proportion that the boron precipitation is completely terminated below a temperature $T_0$ of the carrier surface, which is at least about 1200° K, then a steep precipitation curve is generally obtained, at which a relatively slight increase in temperature causes a considerably greater increase in yield than can be obtained by the same temperature increase if the reaction gas does not contain HCl, operating in both cases at a temperature practically only slightly different from that which results in cessation of the precipitation. On the other hand, when the working point, that is, the precipitation temperature T, is placed into the steep range of the precipitation curve, a slight decrease in temperature causes a very readily noticeable decrease of precipitation, in contrast to curve $a$, which can be extended down to the zero value and even to a negative value. Consequently, the boundary surfaces of the growing boron become extremely smooth and uniform.

For securing a satisfactory growth of the lowest-temperature modification of the boron, precipitating at temperatures below the approximate value of 1300° K., a relatively small addition of HCl is sufficient; in some cases, and with a corresponding guidance of the gas flow, even the HCl content evolving from the conversion of the gas mixture consisting of boron trichloride and hydrogen may suffice; this evolving HCl content being approximately equal to the boron trichloride content in the gas mixture to be dissociated. However, for precipitation and satisfactory crystalline growth of the high-temperature modification of boron, precipitating at temperatures above the approximate value of 1700° K., a considerable amount of added HCl (see the diagram) is required if the temperature of the commencing boron dissolution is to be approximately 200° below the boron precipitation temperature.

To understand the cause of the above-mentioned disturbances in the crystalline or monocrystalline growth and hence also for explaining the performance of the method according to the invention, it should be kept in mind that the carrier body is heated to the necessary surface temperature. With such heating, employing either inductive heating or electricity to the electrodes joined with the ends of the carrier, those localities of the carrier surface which protrude out of the normal level of the carrier surface possess the lowest temperature, whereas the receding localities of the carrier surface possess the hottest. Consequently, if an electric overheating were employed, the protruding localities of the carrier surface should be expected to exhibit a smaller amount of precipitation than occurs at the receding localities, for example in grooves or striations. This is indeed so, but the resulting compensation is insufficient because the protruding localities are preferentially contacted by fresh reaction gas, whereas the receding localities generally receive a considerably less favorable supply of reaction gas. Consequently, the more rapid growth at protuberances of the carrier surface can be compensated only incompletely in this manner.

It has been observed that the temperature differences between protruding localities and the normal carrier surface may amount up to more than 200° C. For that reason, care is taken according to the present invention, that the precipitation curve possesses a defined intersection point $T_0$ with the temperature axis. Furthermore, the precipitation curve is so adjusted that a very slight temperature increase beyond $T_0$ results in a relatively large yield. In addition, the working temperature T at the carrier surface is so chosen that the protruding and hence relatively cold localities receive little precipitation until they are levelled and thereby the temperature of these localities is equalized with the datum value T. This is reliably secured, when the temperature of the protruding and hence cold localities is below the equilibrium temperature $T_0$ because then the precipitation at these localities will not only stop but conversely, the removal of substance will take place at these localities thus accelerating the levelling of the carrier surface.

It has been found that the purpose thus aimed at by the invention is completely attained when the temperature $T_0$ is at least 1200° K. and the working temperature T is not higher than 200° C. above the temperature $T_0$. For technological reasons of manufacture it is advisable, when using a monocrystalline carrier of rod or wire shape, that the carrier is crystallographically oriented to have the rod axis extend in a crystal orientation corresponding to a given preferential direction of growth.

The working temperature T, preferable for use in practice, as well as the addition of HCl or the like compound is generally dependent upon the kind of the reaction gas mixture to be used. For example, when the reaction gas mixture is composed of boron trichloride and hydrogen in the abovementioned molar ratio, the precipitation temperature T, for precipitation of the high-temperature modification of boron, may be chosen at about 1900° K. By an addition of $5n_0$ HCl, an equilibrium temperature $T_0$ of about 1800° K. can then be obtained.

According to the results of investigations made so far, silicon definitely acts to form donor levels in the crystalline lattice of boron. Silicon is a particularly pronounced impurity in the halogenides applicable for pyrolytic boron precipitation. Furthermore, when using conventional glass or quartz vessels, some silicon contamination of the processing space from the vessel walls must be taken into account even if the halogenides are sufficiently prepurified. A silicon impurity, once built into the boron lattice, can hardly be removed by zone melting, because silicon in boron possesses a very unfavorable distribution coefficient.

This imposes exacting requirements upon the purification of the boron compound from which boron is thermally precipitated upon the carrier body, and also upon the apparatus used for the boron precipitation, which apparatus may not have components from which silicon could evaporate into the processing space. It is therefore another object of my invention to simplify such requirements by creating novel processing conditions that permit the use of a reaction gas with a relatively large silicon content but nevertheless result in keeping the silicon content of the precipitated boron extremely slight. The proportion of precipitated silicon is much smaller than that contained in the reaction gas.

Thorough investigation has shown that the equilibrium of the dissociation of the disturbing silicon compounds in the reaction gas is displaced by the addition of hydrogen-halogen compounds, for example hydrogenchloride. This displacement, with the correspondingly dimensioned proportions of the other substances of the reaction process, particularly the hydrogen content in the reaction gas, is such that silicon is no longer precipitated below a given minimum temperature, even if silicon is still contained in a relatively large proportion in the reaction gas. Relative to the molar ratios of boron, silicon and hydrogen in the reaction gas suitable for the pyrolytic production of boron, it has further been ascertained, that these minimum temperatures for silicon precipitation, with an addition of appreciable quantities of hydrogen-halogen compounds, for example HCl, can be placed sufficiently above the corresponding minimum temperatures for the precipitation of boron. This requires that the molar ratios in the reaction gas are kept within certain limits and the temperature at the carrier surface, upon which the largest possible quantity of boron is to precipitate but upon which practically no silicon is to precipitate, is so chosen that this surface temperature is below the minimum precipitation temperature of silicon but above the minimum precipitation temperature of boron. It is particularly favorable to keep the proportion of the added halogen compounds in the reaction gas mixture so large, that the minimum temperature at which silicon can precipitate from the silicon-containing gas mixture, is higher than the melting temperature of boron.

According to another feature of my invention, therefore, and in addition to supplying hydrogen-halogen compound to the reaction gas mixture, which, aside from the boron-containing compound and hydrogen, is contaminated by silicon, the temperature of the carrier surface upon which the boron is pyrolytically precipitated, is kept above the minimum precipitation temperature of boron but below the minimum precipitation temperature of silicon. The reaction gas used for this purpose preferably contains the vaporous or gaseous halogen-containing compound of boron mixed with hydrogen in an atomic ratio of boron to hydrogen of at least about 2%, the silicon content being present in form of vaporous or gaseous silicon compounds in a maximal atomic silicon to boron ratio of about 0.1 atom percent, these ratios applying to the reaction gas mixture prior to adding thereto the hydrogen halide that displaces the reaction equilibrium in favor of the precipitating boron.

According to investigations carried out so far, the cause for the occurrence of the minimum precipitation temperature of silicon, present in the reaction gas in the form of silicon tetrachloride ($SiCl_4$) for example, is the fact that according to the mass-action law a given HCl content for a given hydrogen concentration corresponds to a definite $SiCl_4$ equilibrium pressure.

Calculating the $SiCl_4$ equilibrium pressures for a defined precipitation temperature in accordance with the equation $$SiCl_4 + 2H_2 \rightarrow Si + 4HCl$$

the very considerable dependence of these equilibrium pressures upon the HCl content becomes apparent. This is illustrated by the following series of examples relating to a reaction temperature, for example of 1700° K., and a molar ratio boron trichloride to hydrogen=1:10, at which the $p_{H_2}$ value $\cong 1$ can be applied.

Silicon built into boron according to equation:

$$SiCl_4 \text{ (gaseous)} + 2H_2 \rightleftharpoons Si \text{ (solid)} + 4HCl$$

Equilibrium coefficient:

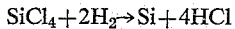
$$K_p = 8.0 = \frac{p^4_{HCl}}{p_{SiCl_4} p^2_{H_2}}$$

for the mole ratio $BCl_3/H_2 = 1:10$ one can set: $p^2_{H_2} \cong 1$.

For $p_{HCl} = 5 \cdot 10^{-2}$ [atm.]

it follows by calculation that:

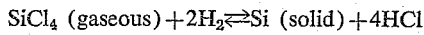
$p_{SiCl_4}$ at $7.8 \cdot 10^{-7}$ [atm.]; this is $7.8 \cdot 10^{-6}$ mol $SiCl_4$/mol $BCl_3$ or $7.8 \cdot 10^{-4}$ mol percent $SiCl_4$ For $p_{HCl} = 10^{-1}$ [atm.]

(experimentally attainable HCl equilibrium concentration) one calculates:

$p_{SiCl_4} = 1.25 \cdot 10^{-5}$ [atm.]; this is $1.25 \cdot 10^{-4}$ mol $SiCl_4$/mol $BCl_3$ or $1.25 \cdot 10^{-2}$ mol percent $SiCl_4$ For $p_{HCl} = 2 \cdot 10^{-1}$ [atm.]

the calculation results in $p_{SiCl_4} = 2 \cdot 10^{-4}$ [atm.]; this is $2 \cdot 10^{-3}$ mol $SiCl_4$/mol $BCl_3$ or $2 \cdot 10^{-1}$ mol percent $SiCl_4$ It follows from the foregoing that the concentration limit of silicon tetrachloride, which can be present without silicon precipitation in the gas equilibrium, is varied by about one power of ten when doubling the HCl content. Consequently, in the last of the foregoing examples silicon becomes precipitated only when the proportion of $SiCl_4$ in $BCl_3$ exceeds $10^{-1}$ mol percent.

Consequently, for the silicon content in any given reaction gas mixture, there is an HCl concentration which prevents silicon precipitation in boron, because in this case the equilibrium concentration of silicon tetrachloride is larger than the quantity of silicon tetrachloride brought into the reaction space. On the other hand, of course, for a given HCl and $H_2$ concentration, the silicon precipitation can be prevented by varying the precipitation temperature.

FIG. 2 represents the relation between silicon precipitation, HCl content and temperature of the boron precipitation for a mole ratio (MV) $BHal_3/H_2 = 0.1$ according to the above-stated equation. The curve $a$ in FIG. 2 is without HCl addition. The curves $b$ to $e$ show the effect of HCl additions in mol percent as indicated next to the respective curves. It has also been found that when the hydrogen excess in the reaction gas is not too extreme or when the silicon-halogenide concentrations are relatively large, for example about $10^{-2}$ mol percent in the boron halogenide, an important intermediate function is performed by the formation of subchloride. Thus, for example, the dissociation of silicon tetrachloride takes place in the following partial stages.

(1) $\quad\quad\quad SiCl_4 + H_2 \rightarrow SiCl_2 + 2HCl$ (2) $\quad\quad\quad SiCl_2 + H_2 \rightarrow Si + 2HCl$ Investigation has further shown that during the first reaction, namely the formation of the subchloride $SiCl_2$ according to Equation 1, the subchloride formation increases with increasing temperature, whereas in the second reaction according to Equation 2 the formation of silicon from the subchloride decreases with increasing temperature. Consequently, the reaction equilibrium becomes displaced at sufficiently high temperatures to such an extent toward silicon subchloride, that the silicon which may have become precipitated upon the carrier surface by pyrolytic dissociation, is dissolved as subchloride from the carrier surface with the chlorine ion of the added HCl with liberation of hydrogen. This, however, requires that the proportion of the halogen compound, for example HCl, in the reaction gas is kept sufficiently large and the hydrogen content in the reaction gas is not made too large.

By virtue of these two partial reactions, which vary inversely to each other with increasing temperature, precipitation of silicon can be prevented by a corresponding choice of the carrier-surface temperature upon which the boron is being precipitated, and adding to the reaction gas mixture a sufficiently large proportion of a halogen compound, particularly HCl. Thus, with a proportion of about $10^{-2}$ mol percent silicon tetrachloride in boron trichloride, the proportion of the precipitated silicon in the precipitated boron can be varied by varying the halogen or hydrogen chloride content in the reaction gas mixture.

FIG. 2 represents the result of these investigations. The abscissa indicates the values of absolute temperature $T$ at the surface of the carrier upon which the boron is precipitated together with silicon from the above-mentioned reaction gas mixture passing along the carrier. The ordinate indicates the coefficient $\alpha$, which represents the ratio of the silicon content in the solid precipitated boron to the silicon content of the reaction gas mixture relative to the boron. A coefficient of 0.6 for example, indicates that the amount of silicon in the precipitated boron is only 60% of the proportion of silicon, relative to boron, contained in the reaction gas mixture. Also indicated in FIG. 2 is the mole ratio $$MV = n_{BX_3}/n_{H_2} = 0.1 \quad (X = halogen)$$

between the boron compound ($BX_3$) and the hydrogen gas content of the reaction gas mixture, for which the curves of FIG. 2 were calculated. Indicated as parameters at the respective curves in FIG. 2 are the mole percent proportions of HCl, relative to the boron compound in the reaction gas mixture. Referring to the total equation for the reaction and precipitation process of silicon onto the carrier $$SiCl_4 + 2H_2 \rightarrow Si + 4HCl$$

the reaction equilibrium is displaced, as shown by the curves, to values more unfavorable to silicon precipitation, the more HCl is added to the reaction gas mixture. For example, when the mixture does not contain HCl, then the coefficient $\alpha$ becomes equal to 1 at a temperature $T_1$ approximately 700° K.; that is, the atom percentage of silicon in the precipitated boron is just as large as the atom percentage of silicon, relative to boron, in the reaction gas mixture. However, when the reaction gas mixture contains 20 mol percent HCl, relative to the boron compound in the reaction gas, then virtually no silicon is precipitated up to the temperature $T_{01}$ of about 1200° K. Only at still higher temperatures, does the coefficient $\alpha$ of the precipitated boron greatly increase. At higher molar percentage values of the HCl (40 mol percent, 60 mol percent and 100 mol percent), the temperature, at which the precipitation of silicon commences, increases to correspondingly higher minimum values ($T_{02}-T_{04}$). Only after passing above these minimum temperatures can the precipitation of silicon commence, and these temperatures can be increased far above the melting point of boron.

The precipitation of silicon together with boron upon the carrier is additionally dependent upon the proportion of hydrogen in the reaction gas mixture from which the precipitation takes place. This can be recognized from study of the total reaction equation for the precipitation of silicon onto the carrier, indicating that an increasing hydrogen content displaces the equilibrium of the reaction in favor of silicon precipitation and thereby reduces the minimum temperature $T_0$ necessary for silicon precipitation. It follows that the above-mentioned molar ratio $MV$ between the boron compound and the hydrogen should preferably not decline below the value of 0.02 (2%). This is to be taken into account particularly at the beginning of the process for the following reason. It is preferable, before supplying the reaction gas mixture, to fill the reaction vessel with hydrogen. This is done for example for the purpose of subjecting the carrier, such as a body of boron, to incandescent temperature in a flow of hydrogen shortly prior to commencing the precipitation. Annealing the boron carrier in a current of pure hydrogen, prior to the precipitation of boron, has the effect of removing the oxide skin, always present on the carrier surface, by the formation of gaseous boron oxide ($B_2O_3$ and $BO$), thus affording a uniform growth of monocrystalline boron on the carrier. It is of advantage with respect to reducing the silicon content in the precipitated boron, that during dissociation of the boron-halogen compound resulting in precipitation of boron onto the carrier, there be in the gaseous mixture a halogen-hydrogen compound, for example in accordance with the reaction equation $$BCl_3 + 3/2 H_2 = B + 3HCl$$

because the HCl thus evolving counteracts the precipitation of silicon for the abovementioned reason. However, it must be realized that this effect can take place only after the pyrolytic conversion has commenced. At an earlier stage of the process, for example immediately at the starting moment when the gaseous mixture enters for the first time into the reaction chamber and into contact with the highly heated carrier, no amount or only an insufficient amount of HCl has been formed by dissociation of the boron compound in the gas mixture, so that the proportion of the silicon which precipitates from the gaseous mixture onto the carrier together with the boron may be too high. This can occur to such an extent that the silicon proportion in the completed boron rod is excessive, because the full amount of the silicon contained in the reaction gas mixture was precipitated in the initial stage of the process, and that even after uniform distribution of the silicon over the entire cross section of the carrier, the silicon content is still too high. Consequently, even though after the started-up condition of the process the proper HX equilibrium concentration is observed as explained above so that practically no silicon is precipitated, the finished boron body may still be unsatisfactory simply because too much silicon was precipitated during the starting-up interval. Therefore, when performing the method, the starting-up operation requires particular attention.

It is therefore preferable to make certain that a sufficient quantity of halogen-hydrogen compound, par larly HCl, is added to the mixture of gaseous boron compound and hydrogen immediately at the beginning of the precipitation process, the additional supply being continued, if necessary, after the starting-up period is terminated and the normal precipitating operation has commenced. It is often desirable after annealing the carrier in a hydrogen current, to rinse the reaction vessel with a hydrogen current prior to supplying boron halogenide to which hydrogen halide is added preferably in an amount of at least about 10 mol percent. Only after rinsing the apparatus with this mixture is then the reaction gas mixture introduced into the reaction vessel. Then this reaction gas mixture may comprise a hydrogen halide content of the same magnitude which can be reduced during the further course of the process. The necessary quantity, as explained above with reference to FIG. 1, is dependent upon the temperature T of the carrier surface upon which the boron precipitates. For example, when operating with a surface temperature T of about 1700° K., it is preferable to add, at least at the commencement of the process, a high molar percentage of HCl, at least in the amount of the HCl quantity that is present in the gas mixture after the reaction is a normal, steady-state operation. When then the dissociation of the boron compound and the formation of the hydrogen halide has commenced, the quantity of the hydrogen halide additionally supplied to the gas mixture can be reduced because the further amount of hydrogen halide evolving from the dissociation of the boron compound also coacts in preventing the precipitation of silicon.

As explained, the addition of a hydrogen halide to the reaction gas mixture has an unfavorable effect upon the precipitation of the boron from this gas mixture, because with increasing proportion of the hydrogen halide in the gas mixture the quantity of the boron precipitating from this mixture decreases. According to the invention, therefore, the quantity of the continuously added hydrogen halide thereby has an upper limit, since the selected precipitation temperature at the carrier surface upon which the boron precipitates must still be sufficiently high above the minimum precipitation temperature of the boron. It is particularly of advantage to select the value of this minimum precipitation temperature, relative to the surface temperature of the carrier, so that, according to the theoretically possible yield curve, at least about 50% of the boron supplied to the reaction vessel in form of dissociable boron compound is precipitated upon the carrier ($\alpha$ boron being at least equal to 0.5).

As also explained, the hydrogen in the gas mixture is essential in that an increasing proportion of hydrogen in the mixture promotes the precipitation of silicon and boron. This is of importance particularly in cases where a monocrystalline growth of the precipitated boron is to be obtained. For boron to grow monocrystalline on a monocrystalline carrier of boron, it is often desirable to remove traces of adhering oxygen from the monocrystalline carrier by annealing the carrier in a hydrogen current before commencing the precipitation. For this purpose the monocrystalline carrier of boron, mounted in the reaction vessel, is heated by passing an electric current through the carrier before the reaction gas mixture is permitted to enter into the reaction space, while simultaneously flowing a current of hydrogen through the reaction space. If without further expedients, the reaction gas mixture were supplied to the reaction space immediately upon annealing in the hydrogen atmosphere, the hydrogen concentration relative to the boron halogenide concentration would be particularly high at the commencement of the precipitation process, thus promoting the precipitation of silicon.

A particularly favorable way of starting the precipitation according to the invention is to initially add the hydrogen halide to the gas mixture in such a large quantity that neither boron nor silicon is precipitated while the carrier body is at the high precipitation temperature, whereafter the supply of the hydrogen halide is reduced as required to obtain precipitation of boron onto the carrier.

During the relatively short heating-up period of the carrier body, particularly a boron body of monocrystalline constitution, in a gaseous mixture of hydrogen and silicon halogenide compound containing a great amount of hydrogen halide, a method is provided which reliably prevents the precipitation of impurities also at the beginning of the boron precipitation and consequently when passing from the purifying stage to the precipitating stage. As is apparent from FIG. 1, the boron precipitation can be completely prevented by adding hydrogen halide to a gaseous mixture containing the boron compound to be dissociated. For each surface temperature of the carrier body, there exists a specific ratio of the boron compound to the hydrogen halide at which no boron precipitation takes place. This ratio, or a smaller ratio, is adjusted in the mixture in which the carrier body is being annealed for purifying its surface. The hydrogen halide then simultaneously takes care of an accelerated elimination of the oxide skin through the formation of suboxide compounds.

According to the equation

$$B + 3HX \rightarrow BX_3 + 3/2 H_2$$

the hydrogen halogenide is added in such a quantity that an elimination of boron from the carrier body occurs. At a given temperature of the carrier body, this effect can be secured by reducing the ratio of boron compound to hydrogen halide relative to the particular ratio at which a precipitation no longer occurs. In other words, the desired effect is obtained by adding more hydrogen halogenide to the gaseous mixture. Depending upon the period of time during which the carrier body is kept at glowing temperature in the gaseous mixture, layers of varying thickness are eliminated. In this manner, the carrier surface is smoothed and, when using a monocrystalline carrier, particularly a carrier of monocrystalline boron, the undisturbed lattice structure is laid bare and thus reliably securing a monocrystalline growth of boron after termination of the purifying stage. For this reason, it is preferable to heat the carrier to glowing temperature in the above-mentioned gas mixture for a length of time sufficient to eliminate a multiple of the thickness of the oxide skin present on the carrier at the beginning of the heating operation.

After the carrier body is purified and pretreated in this manner, the supply of hydrogen halogenide is reduced sufficiently to shift the reaction equilibrium in favor of the boron to effect precipitation of boron on the carrier body. The hydrogen halide content in the gas mixture is then being reduced to the degree required to provide at the beginning of the boron precipitation, for a hydrogen halide content sufficient for preventing the precipitation of silicon from the reaction gas mixture. As explained, this is due to the fact that the hydrogen halide content displaces the reaction equilibrium so that the minimum precipitation temperature for silicon is above the surface temperature of the carrier body.

If the dissociation of the boron compound and the precipitation of boron are to occur in accordance with the equation

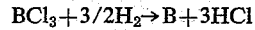

$$BCl_3 + 3/2 H_2 \rightarrow B + 3HCl$$

the quantity of the hydrogen halide added to the gas mixture must be reduced or completely stopped because the hydrogen halogenide evolving from the dissociation of the boron already counteracts the precipitation of impurities of lower concentration.

Reference is made in the foregoing to performing the method of first purifying and smoothing the carrier surface, or exposing the monocrystalline lattice structure of a carrier body, with the aid of the gaseous mixture that contains a boron compound. However, a similar result can also be obtained, and is in some cases preferable, by subjecting the carrier body, prior to supplying this gaseous mixture, to an additional pre-etching or purification of the carrier surface in a gaseous atmosphere containing hydrogen alone or an admixture of hydrogen and a hydrogen halide such as HCl.

Examples of equipment for producing boron according to the invention will be described presently with reference to FIGS. 3 to 6.

Figure 3:
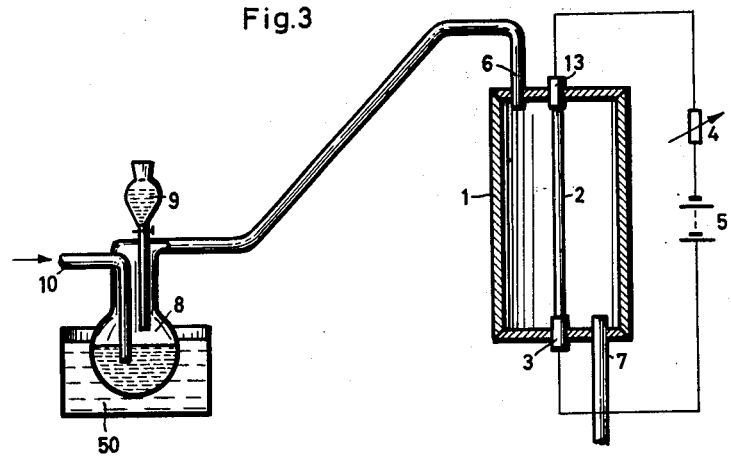

According to FIG. 3, a thin rod 2 of monocrystalline boron, in hyperpure or electronically doped condition, is mounted in a processing vessel 1. The rod serves as a carrier upon which hyperpure, namely intrinsically conducting, or doped boron is to be grown in crystalline, preferably monocrystalline form by precipitation from the gaseous phase. For doping the boron, gaseous compounds of doping substances can be added to the reaction gas mixture during the precipitation process. Suitable as doping substances are for example elements of the second and fourth groups of the periodic system. These elements produce acceptor or donor levels or atoms in the crystal lattice of the precipitated boron. Applicable as a gaseous compound of a dope element from the second group are beryllium halides, such as beryllium chloride, for example. The beryllium, precipitating together with the boron, forms acceptor atoms in the crystal lattice. An example of a gaseous compound of a donor element from the fourth group are various readily volatile halogen compounds of silicon and carbon, such as silicon tetrachloride or carbon tetrachloride. Silicon and carbon act as donor materials in the crystal lattice of boron.

To prevent the introduction of silicon into the precipitation asmosphere from parts of the apparatus, it is preferable to employ, particularly for the highly heated components, pure sintered corundum ($Al_2O_3$, high refractory aluminum oxide). This substance may be employed for example as an inner lining on the inner wall of the vessel in the reaction space. The other parts of the apparatus may consist of various types of aluminum borate glasses in combination, if desired, with the quartz-like substances $AlPO_4$, $BPO_4$. Larger parts of the equipment, for example the reaction vessel proper, can be made of stainless steel such as that available in the trade under the name V2A steel.

The rod 2 is mounted between electrodes 3 and 13 consisting of carbon which may be covered with $Al_2O_3$. The rod 2 is heated by electric current to the precipitation temperature of $T=1400°$ C., for example. The current is supplied through a controllable stabilizing resistor 4 from a current source 5. As described, the rod 2 can first be made electrically conductive by heating it with the aid of heat radiators.

The reaction gas enters the precipitation apparatus through a pipe 6 and, after precipitation of boron, leaves the vessel through an outlet pipe 7. The reaction gas mixture is produced by means of an evaporator vessel 8 containing for example highly purified boron trichloride in liquid condition. A dripper pipette 9 enters the evaporator vessel 8 from above, and is filled with highly pure distilled water. The water is permitted to drip into the boron trichloride at a controllable rate. This causes some of the boron halogenide compound in the evaporater vessel to be hydrolyzed whereby HCl and boric acid are produced. Highly purified hydrogen is supplied through a pipe 10 into evaporator 8 so as to pass through the liquid. In evaporator 8, the hydrogen current becomes charged with vapor of the boron compound which is present to an excess amount and is simultaneously charged with the hydrochloride evolving from the liquid in the vessel. The mixture then passes through pipe 6 into the precipitation vessel 1, if desired together with further hydrogen that may be added through a branch conduit (not shown). Also if desired, another evaporator vessel equipped with boron trichloride can be connected in parallel or series relation to the evaporator 8 but differs from evaporator 8 in that no HCl development is effected in the second evaporator vessel.

The evaporator or evaporators are disposed in a temperature bath 50, with whose aid the vaporization rate of the boron compound can be controlled. By adjusting the temperature in the evaporator, the speed of the hydrogen current, and the rate of water supply from the pipette 9, the composition of the reaction gas mixture can be controlled and regulated in any desired definite manner. By the content of HCl, the shape and position of the precipitation curves are determined in the above-described manner and the precipitation of silicon is prevented, also as explained above.

Figure 4:
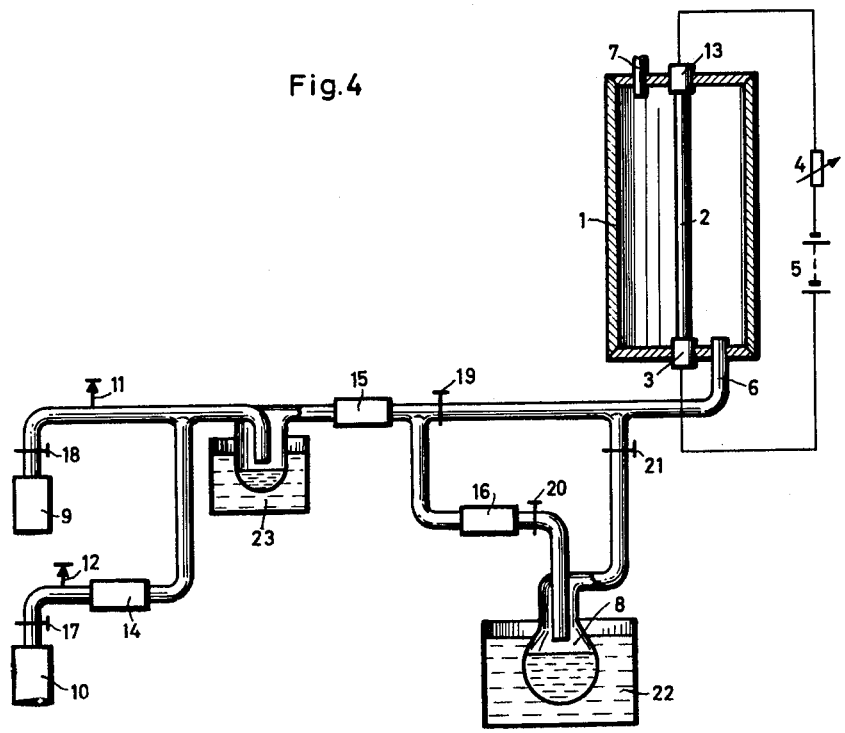

The apparatus shown in FIG. 4 is to some extent similar to that described above with reference to FIG. 3, corresponding components being designated by the same reference numerals respectively. The evaporator vessel 8 according to FIG. 4 contains highly purified boron trichloride in liquid condition. Hydrogen is supplied from a pressure tank 9 through a pressure reduction valve 18 and through an overpressure valve 11. Hydrogen chloride is supplied from the pressure tank 10 through corresponding valves 17 and 12 and is admixed to the hydrogen. The flow velocity and thereby the quantity of added HCl is measured by means of a flow meter 14. A cooling trap 23 serves for freezing out any water vapor contained in the gas mixture. The gas current consisting of $H_2$ and HCl becomes charged in the evaporator 8 with the vapor of the boron compound and then passes through inlet pipe 6 into the reaction vessel.

The evaporator 8 is disposed in a temperature bath 22 with whose aid the vaporization rate of the boron compound can be controlled or regulated. By adjusting the temperature in the evaporator 8 and by means of the valves 17, 18, 19, 20 and 21, the composition of the reaction gas can be adjusted in the desired definite manner. The flow velocity of the individual components of the gas mixture is measured by flow meters 15 and 16 in addition to the above-mentioned flow meter 14.

When using the apparatus for purifying the surface of the carrier rod 2, and referring to the example of the process in which the high-temperature modification of boron is to be precipitated, the carrier rod 2 is maintained at a temperature of about 1400° C. The gaseous mixture entering the reaction vessel through pipe 6 contains boron trichloride and hydrogen in a molar ratio of boron trichloride to hydrogen of 1:10 and consists to 35% of hydrogen chloride. For higher carrier temperatures the percentage of the HCl content in the gas mixture must be accordingly higher.

When using the apparatus for precipitating the lowest-temperature modification of boron, the carrier temperature is kept at about 1000° C. The gas mixture contains boron trichloride to hydrogen in the above-mentioned molar ratio of 1:10 and consists to 25 molar percent of HCl. At lower temperatures, the percentage of the HCl content in the gas mixture is correspondingly lower.

The speed at which this gas mixture passes through the reaction vessel is about 50 liters per hour, for example. By being exposed to this gas flow, the carrier body 2 is heated a sufficient length of time to reduce the oxide skin, preferably sufficiently long for eliminating a multiple of the layer thickness of the oxide skin. The time required for thus eliminating a multiple of the oxide-skin layer thickness is at most about 30 minutes in the examples described above. Thereafter the HCl supply is reduced, for example by closing the valve 17. Consequently, the reaction equilibrium in the gas mixture passing through the reaction vessel is shifted in favor of boron precipitation. Simultaneously the flow speed of the gas is increased relative to the speed maintained during the purifying stage and then amounts maximally to a few hundred liters per hour. This value, however, is greatly dependent upon the size and shape of the processing vessel as well as upon the manner of gas supply and upon the carrier surface.

Figure 5:
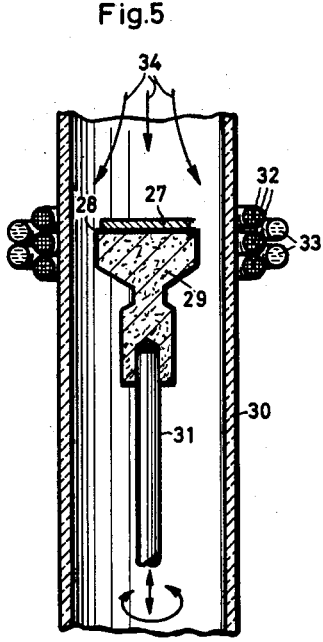

FIG. 5 shows in section a portion of the reaction vessel 30 consisting of a quartz cylinder which may be cooled if desired. The inner wall surface of the cylinder may be lined with sintered pure aluminum oxide as available under the trade name Sinterkorund ($Al_2O_3$). Mounted in the processing vessel is a plate-shaped carrier 27 consisting, for example, of crystalline or monocrystalline boron. The carrier 27 is placed upon a layer 28 of boron nitride powder or upon a pressed plate of boron nitride which in turn is mounted on top of a shaped body 29 of graphite serving as a heating table. Fastened to the table structure 29 is a quartz rod or tube 31 which, however, may also consist of one of the above-mentioned quartzlike types of glass. The rod 31 extends downwardly out of the reaction vessel and is sealed relative to the vessel at the place where it extends through the vessel wall. By means of the rod 31 the table structure 29 together with the carrier 27 can be shifted from the outside in the upward and downward direction and can also be turned about the rod axis. A high-frequency induction coil 32 serves for heating the carrier to the pyrolytic precipitation temperature. The coil 32 surrounds the reaction vessel 30 and is cooled by means of a tubular coil 33 traversed by water when in operation. The fresh gas mixture passes through the reaction vessel through a supply pipe (not illustrated) in the direction of the arrows 34, and the residual gases leave the reaction vessel through an opening (not illustrated) in the lower part of the vessel. In other respects the apparatus is designed and operated as described above for example with reference to FIGS. 3 and 4, and in accordance with the process of the invention.

Figure 6:
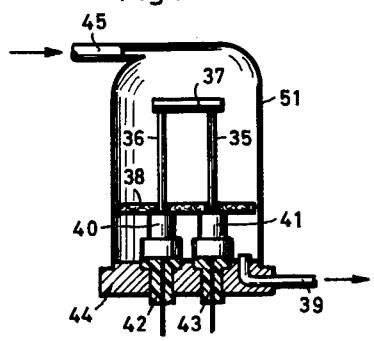

The reaction vessel 51 shown in FIG. 6 consists, for example, of quartz or water-cooled stainless (V2A) steel and its interior surface may be lined with pure sintered aluminum oxide as described above. Two rods 35 and 36, consisting for example of crystalline or momocrystalline boron, serve as carrier bodies for the precipitation process. Their top ends are connected with each other by a bridge piece 37 of spectral carbon or boron. The reaction vessel is divided in to two parts by means of a plate 38 also consisting of sintered aluminum oxide so that essentially only the carrier bodies are contained in the reaction space proper. The apparatus possesses the same advantages as described, in conjunction with the production of silicon, coassigned U.S. application of H. Henker et al., Serial No. 858,223, filed December 8, 1959, which issued as Patent 3,134,695, for Method and Apparatus for Producing Rod-Shaped Semiconductor Bodies. The carrier rods 35, 36 pass through openings in the partitioning plate 38. The residual gases flow through the annular gap between the carrier rods and the partitioning plate thus entering into the chamber beneath the plate 38 from which they escape through an outlet 39. The rod holders 40 and 41 are disposed in the ante-chamber below the partitioning plate 38. The holders serve as current-supply terminals and consist for example of graphite, or of graphite coated with sintered aluminum oxide. The base plate 44 of the apparatus consists of noble metal or is plated with such metals and has bores traversed by insulating bodies 42 and 43 which form a seal for the current-supply leads connected with respective holders 40 and 41. The insulating sealing bodies 42 and 43 may consist of polyfluoroethylene plastics such as available in the trade as Teflon or other high-temperature resistant insulating material. It is preferable to cool the plate 44 by circulating water (not shown). The fresh gas enters into the processing vessel through a pipe 45. In other respects the processing vessel of FIG. 6 can be employed as described above in conjunction with FIGS. 3 and 4 for performing the method of the invention.

By means of apparatus of the type shown in FIGS. 3 to 6, boron can readily be produced by growing it in crystalline or monocrystalline form on the carrier body from the gaseous phase. As mentioned, the electric resistance of the boron rods is extremely high at normal room temperature so that preheating is necessary for obtaining the conductance required to heat the rods during normal processing by passing current longitudinally through the rods. Aside from using the preheating means mentioned in the foregoing, the heating may also be effected by applying to the rods a high voltage as known for the preheating of silicon rods, or also by employing preheated hydrogen.

After completing the initial, purifying stage of the process, the carrier temperature can be varied. Preferably, the carrier temperature is then increased in order to thereby facilitate and promote the precipitation of boron. Aside from the boron-halogen compound described above, various boron halogenides are applicable such as $BCl_2Br$, $BBr_3$ or $BBr_2Cl$. In each of these cases the additional quantity of hydrogen halogenide may consist of hydrogen chloride. However, other hydrogen halides are applicable instead. For example when using $BBr_3$ the added hydrogen halide may consist of HBr.

Applicable as reaction gas is also the residual gas coming from a precipitation apparatus of the same or similar type serving for the production of boron crystals from boron-halogen compounds. The reaction gas supplied through the first apparatus often possesses a natural content of a particular hydrogen halide, due to the conversion occurring in the first precipitation vessel, provided the reaction gas was supplied to the first apparatus in highly pure condition. For that reason, the waste gas coming from the first precipitation vessel may satisfy the requirements to be placed upon the reaction gas according to the present invention. Often, however, the HCl content of such waste gas is too small so that it is necessary to admix a further amount of HCl to such residual gas.

I claim:

1. The process of producing crystalline hyperpure boron, which comprises pyrolytically prepiciptating boron onto a heated boron carrier body at a selected precipitation temperature by contacting the carrier body with a flow of reaction gases containing a gaseous halogen compound of boron to be pyrolytically reduced and precipitated; and adding to the reaction gases, prior to contacting them with the carrier body, a hydrogen-halogen compound in a quantity at which the equilibrium temperature of commencing boron redissolution by the reaction gases is at most 200° C. below said precipitation temperature, the boron precipitation being completely stopped below said equilibrium temperature.

2. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of hydrogen-halogen compound; admixing to the reaction gases, prior to contacting them with the carrier body, an additional quantity of said hydrogen-halogen compound in an amount at which the equilibrium temperature of commencing boron re-dissolution by the reaction gases is at most 200° C. below said precipitation temperature, the boron precipitation being completely stopped below said equilibrium temperature.

3. The process of producing pure boron in monocrystalline form, which comprises heating a carrier body of monocrystalline boron to a selected pyrolytic processing temperature, contacting the heated monocrystalline body with a flow of reaction gases containing hydrogen mixed with boro-halogen compound, whereby boron is reduced from the compound and precipitated on said body in monocrystalline form; and adding to the reaction gases, prior to contacting them with the carrier body, a hydrogen halide in a quantity at which the equilibrium temperature of commencing boron re-dissolution by the reaction gases is at most 200° C. below said precipitation temperature, the boron precipitation being completely stopped below said equilibrium temperature.

4. The process of producing crystalline hyperpure boron, which comprises pyrolytically precipitating boron onto a heated boron carrier body at a selected precipitation temperature by contacting the carrier body with a flow of reaction gases containing a gaseous halogen compound of boron to be pyrolytically reduced and precipitated; and adding to the reaction gases, prior to contacting them with the carrier body, a hydrogen-halogen compound in a quantity at which the equilibrium temperature of commencing boron re-dissolution by the reaction gases is at most 200° C. below said precipitation temperature, the boron precipitation being completely stopped below said equilibrium temperature, and adjusting said equilibrium temperature to a value above about 1200°° C.

5. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of a hydrogen-halogen compound; admixing to the reaction gases, prior to contacting them with the carrier body, an additional quantity of said hydrogen-halogen compound, produced by dissociation of a highly purified halogen-containing boron compound, in an amount at which the equilibrium temperature of commencing boron re-dissolution by the reaction gases is at most 200° C. below said precipitation temperature, the boron precipitation being completely stopped below said equilibrium temperature.

6. The process of producing crystalline hyperpure boron, which comprises pyrolytically precipitating boron onto a heated boron carrier body at a selected precipitation temperature by contacting the carrier body with a flow of reaction gases containing a gaseous halogen compound of boron hydrogen and hydrogen halide, said reaction gas being the exit gases from a previous process.

7. The process of producing crystalline hyperpure boron which comprises passing hydrogen into an evaporator containing a liquid boron halogenide, adding purified distilled water to said liquid boron halogenide thereby producing hydrogen halide, said hydrogen becoming charged with boron halogenide vapors and hydrogen halide thereby producing a reaction gas mixture, passing said reaction gas mixture into a precipitation vessel containing a boron carrier body, said carrier body being at a temperature within 200° C. above the temperature where monocrystalline boron first precipitates on said carrier body.

8. The process of producing crystalline hyperpure boron which comprises passing hydrogen into an evaporator containing a liquid boron trichloride, adding purified distilled water to said liquid boron trichloride thereby producing hydrogen chloride, said hydrogen becoming charged with boron trichloride vapors and hydrogen chloride thereby producing a reaction gas mixture, passing said reaction gas mixture into a precipitation vessel containing a boron carrier body, said carrier body being at a temperature within 200° C. above the temperature where monocrystalline boron first precipitates on said carrier body.

9. The process of producing crystalline hyperpure boron, which comprises pyrolytically precipitating boron onto a heated boron carrier body at a selected precipitation temperature by contacting the carrier body with a flow of reaction gases containing a gaseous halogen compound of boron, hydrogen, and hydrogen halide, the atomic ratio of boron to hydrogen being at least about 2% and containing a maximum silicon impurity of 0.1 atom percent of silicon to boron, said precipitation temperature being above the minimum precipitation temperature of boron and below the minimum precipitation temperature of silicon.

10. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of a hydrogen-halogen compound, adding a high ratio of hydrogen halide to boron compound with reaction gas at its initial stages of the pyrolytic precipitation, and subsequently reducing the amount of hydrogen halide addition as the precipitation commences.

11. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of hydrogen-halogen compound, rinsing the reaction vessel with a gas mixture consisting of hydrogen and hydrogen halide, thereafter passing said reaction gas mixture admixed with an additional quantity of hydrogen halide in an amount at which the equilibrium temperature of commencing boron redissolution by the reaction gases is at most 200° C. below said precipitation temperature, the boron precipitation being completely stopped below said equilibrium temperature.

12. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of hydrogen halide; admixing to the reaction gases, prior to contacting said reaction gases with the carrier body, an additional quantity of hydrogen halide, the ratio of hydrogen, hydrogen halide and boron halogenide and the temperature of the carrier body being adjusted so that the precipitation of silicon impurity is prevented during the boron precipitation.

13. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of hydrogen halide; initiating the process by passing hydrogen through the reaction vessel while heating the carrier to high temperature, then passing a mixture of hydrogen and hydrogen halide through the reaction vessel while maintaining the carrier at reaction temperature, and thereafter passing said reaction gas mixture admixed with an additional quantity of hydrogen halide in an amount at which the equilibrium temperature of commencing boron re-dissolution by the reaction gases is at most 200° C. below said precipitation temperature, the boron precipitation being completely stopped below said equilibrium temperature.

14. The process of producing crystalline hyperpure boron, which comprises pyrolytically precipitating boron onto a heated boron carrier body at a selected precipitation temperature by contacting the carrier body with a flow of reaction gases containing hydrogen mixed with boron trichloride to be pyrolytically reduced and precipitated, the reaction being accompanied by the formation of hydrogen chloride; initiating the process by passing hydrogen through the reaction vessel while heating the carrier to high temperature, then passing a mixture of hydrogen and hydrogen chloride through the reaction vessel while maintaining the carrier at reaction temperature, and thereafter passing said reaction gas mixture admixed with an additional quantity of hydrogen chloride in an amount at which the equilibrium temperature of commencing boron re-dissolution by the reaction gases is at most 200° C. below said precipitation temperature, the boron precipitation being completely stopped below said equilibrium temperature.

15. The process of producing crystalline hyperpure boron, which comprises pyrolytically precipitating boron onto a heated boron carrier body at a selected precipitation temperature by contacting the carrier body with a flow of reaction gases containing hydrogen mixed with a gaseous halogen compound of boron to be pyrolytically reduced and precipitated, the reaction being accompanied by the formation of hydrogen halide; initiating the process by passing hydrogen through the reaction vessel while heating the carrier to high temperature, then passing a mixture of hydrogen and hydrogen halide through the reaction vessel while maintaining the carrier at reaction temperature for a sufficient length of time to eliminate a multiple of the oxide skin thickness present on the carrier body at the beginning of the operation and thereafter passing said reaction gas mixture admixed with an additional quantity of hydrogen halide in an amount at which the equilibrium temperature of commencing boron re-dissolution by the reaction gases is at most 200° C. below said precipitation temperature, the boron precipitation being completely stopped below said equilibrium temperature.

References Cited in the file of this patent
UNITED STATES PATENTS

| | | |
|---|---|---|
| 2,839,367 | Stern et al. | June 17, 1958 |
| 2,854,353 | Schwope | Sept. 30, 1958 |
| 3,020,128 | Adcock et al. | Feb. 6, 1962 |
| 3,053,636 | Bean et al. | Sept. 11, 1962 |